United States Patent [19]

Pearson et al.

[11] Patent Number: 5,374,032
[45] Date of Patent: Dec. 20, 1994

[54] BUTTERFLY VALVE ASSEMBLY

[75] Inventors: James E. Pearson, Downers Grove; Dennis R. Carls, Geneva, both of Ill.

[73] Assignee: Eaton Corporation, Cleveland, Ohio

[21] Appl. No.: 96,591

[22] Filed: Jul. 23, 1993

[51] Int. Cl.$^5$ .............................................. F16K 1/22
[52] U.S. Cl. ...................................... 251/368; 251/308
[58] Field of Search ................... 251/368, 305, 308; 137/597, 876

[56] References Cited

U.S. PATENT DOCUMENTS

| | | | |
|---|---|---|---|
| 3,118,465 | 1/1964 | Scaramucci | 251/308 |
| 3,357,680 | 12/1967 | Williams | 251/305 |
| 4,139,590 | 2/1979 | Rubright | 251/305 |
| 4,308,805 | 1/1982 | Spater | 251/308 |
| 4,361,170 | 11/1982 | Peloza | 251/305 |
| 4,783,052 | 11/1988 | Walden | 251/305 |
| 4,786,031 | 11/1988 | Waldrop | 251/305 |

Primary Examiner—A. Michael Chambers
Attorney, Agent, or Firm—Roger A. Johnston

[57] ABSTRACT

A valve of the type for controlling engine coolant flow to a heater core having a resilient butterfly valve formed of thermoplastic elastomeric material. The outer periphery is sufficiently resilient to absorb actuator overtravel in the seated condition. The butterfly has formed integrally therewith a central hub with torque-transmitting surfaces molded therein and a pair of oppositely disposed stiffeners extend outwardly from the hub in the central region of the butterfly. Assembly is simplified by placing the butterfly in the body and inserting a winged actuator shaft through journal holes in the body into the butterfly hub such that the wings on the shaft engage the torque-transmitting surfaces in the hub.

6 Claims, 1 Drawing Sheet

BUTTERFLY VALVE ASSEMBLY

BACKGROUND OF THE INVENTION

The present invention relates to valves of the type employing a pivoted butterfly type movable valve member. Valves of this type are typically employed in automotive applications for controlling flow of engine coolant to and from the passenger compartment heat exchanger or heater core. In such automotive heater core valve applications, it is known to provide a metal butterfly plate spot welded to a pivot shaft rotatably mounted through the walls of the valve housing for connection to an external actuator. Metal plate butterfly valves employed for automotive heater core applications typically are fabricated by inserting the valve plate in a mold and molding an elastomeric bead-rim thereabout for facilitating sealing of the periphery of the metal plate about the wall of the flow passage in the valve housing which is typically formed of die-cast metal or molded thermoplastic material. This method of construction by molding an elastomeric rim on a metal plate and then spot welding the plate to the actuator shaft in the valve housing has proven to be quite costly in the high volume mass production required for automotive heater valve applications.

Furthermore, the aforesaid butterfly valve construction having a metal butterfly spot welded to the actuator shaft has been prone to breakage of the spot welds in service where the actuator shaft experiences overtravel, after the butterfly valve has closed against the wall of the flow passage in the valve, particularly in servomotor powered valve applications. Thus it has been desired to find a way or means of constructing a butterfly valve which is capable of being mass produced in high volume, such as for automotive heater applications, at a low manufacturing cost, and which provides reliable service and will readily absorb some degree of actuator overtravel in service without breakage.

SUMMARY OF THE INVENTION

The present invention provides a butterfly valve of the type suitable for controlling engine coolant flow in automotive heater core applications and which is relatively low in manufacturing cost and capable of absorbing some actuator overtravel after closing without breakage.

The valve of the present invention has its porting arranged for controlling flow as a diverter or by pass valve, and has a molded plastic valve body with a butterfly valve member formed of molded elastomeric material. The valve member has formed integrally therewith a hub portion with torque transmitting surfaces therein and stiffening ribs extending outwardly from the hub and a relatively thin resiliently deformable outer periphery which is capable of absorbing some overtravel rotation of the hub after seating of the outer periphery. The metal actuator shaft is axially slidably assembled in the hub and has surfaces such as "wings" formed thereon which positively engage the torque transmitting surfaces in the hub. In an alternate embodiment, the central region of the butterfly has a metal reinforcing plate insert-molded therein. The butterfly is preferably formed of thermoplastic elastomeric material having a hardness not greater than 50 on the shore "D" scale.

DETAILED DESCRIPTION

Figure 1:
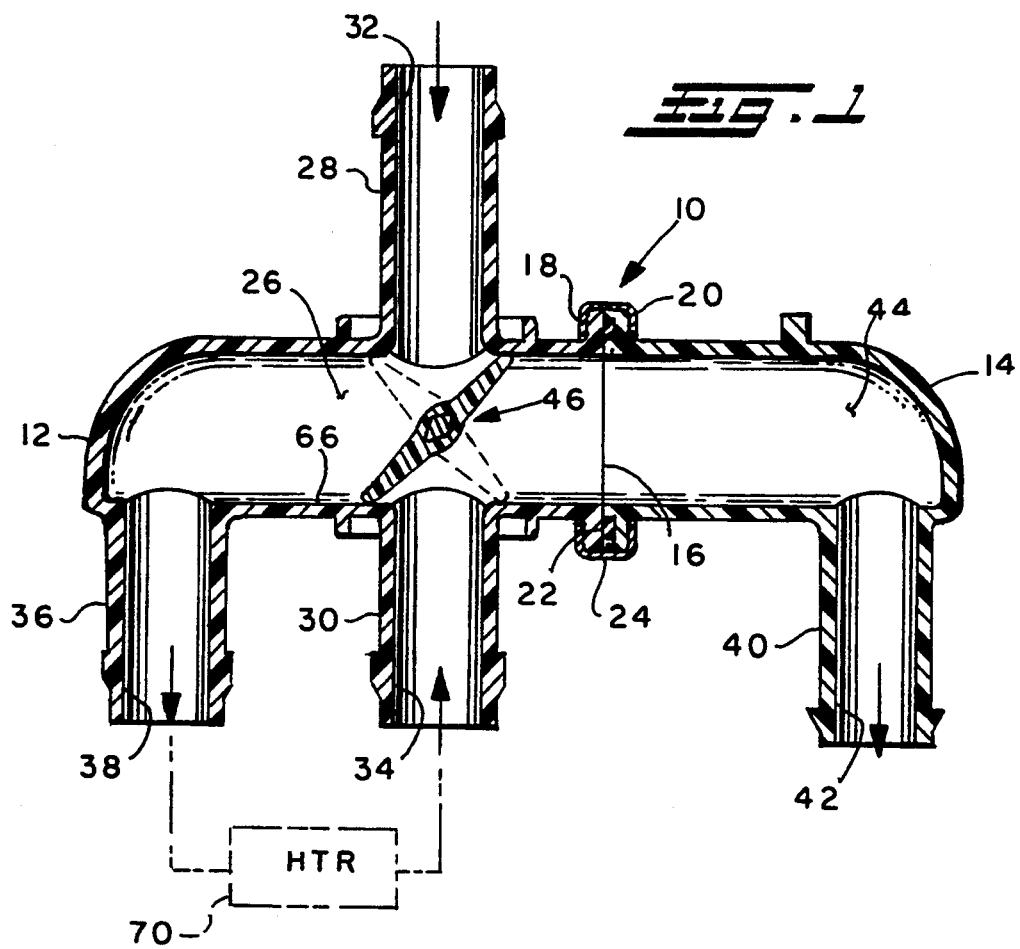
FIG. 1 is a section view of the present invention, taken along the plane of symmetry; and, FIG. 2 is an exploded axonometric view of the butterfly and actuator shaft of the valve of FIG. 1.

Referring to FIG. 1, the valve assembly of the present invention is indicated generally at 10 and has a valve housing or body comprised of an inlet section 12 and an outlet section 14 joined along a parting line 16 by any suitable expedient such as clamping or alternatively weldment. Housing sections 12, 14 are preferably each formed of molded plastic material with a rim or flange formed about the parting line as denoted respectively by reference numerals 18,20. In the presently preferred practice, the body sections 12, 14 are formed of a polyamide material having a hardness of 115 on the Rockwell "R" scale, having preferably a 40% by volume fill of fine glass particles. Flange 20 is formed with a circumferential groove on the parting line side thereof in which is received a resilient sealing ring 22. Flanges 18,20 are held together at the parting line by a peripheral clamping band 24, compressing sealing ring 22 therebetween.

Housing section 12 defines an internal valving chamber 26 having oppositely disposed aligned inlet nipples or bosses 28,30 formed thereon integrally therewith adjacent parting line 16 and defining, respectively, inlet passages 32,34, each of which communicates with valving chamber 26. Housing section 12 has a third nipple 36 formed integrally thereon and disposed distal the parting line 26, preferably in spaced generally parallel arrangement with nipple 30. Nipple 36 has an outlet passage 38 formed therein which also communicates with valving chamber 26. Housing section 14 has a fourth nipple 40 provided thereon and preferably arranged in spaced parallel arrangement with nipple 30. Nipple 40 has an outlet passage 42 formed therein which communicates with an interior flow chamber 44 which is open across parting line 16 to chamber 26.

Figure 2:
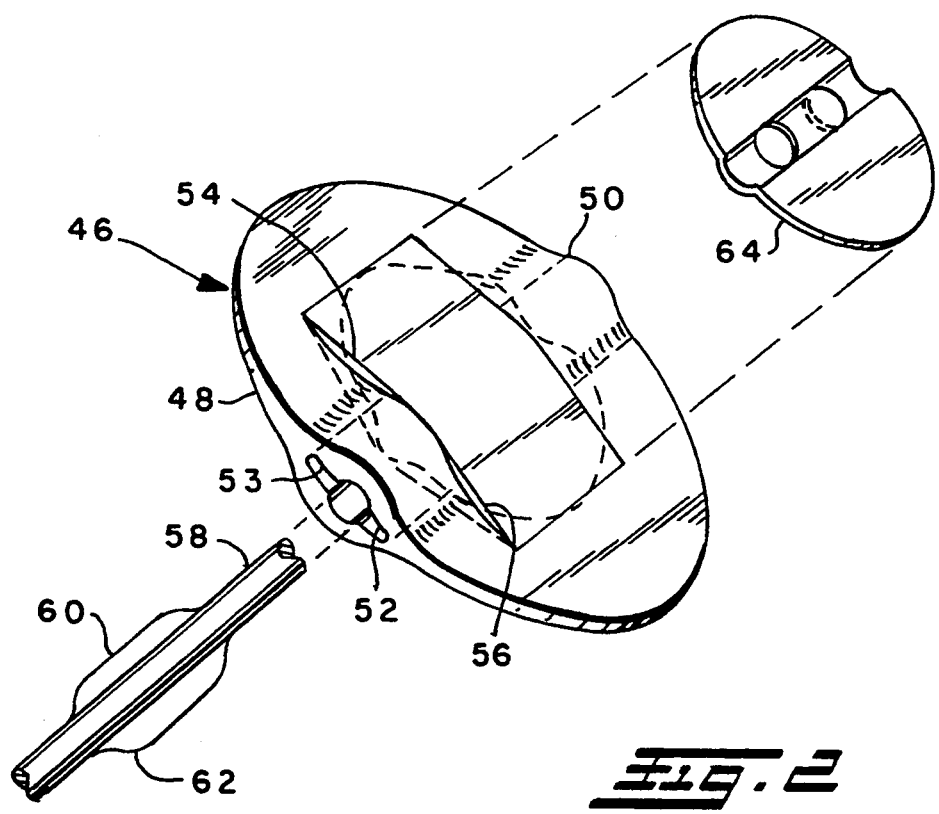

Referring to FIGS. 1 and 2, a movable valving subassembly indicated generally at 46 is mounted in chamber 26 for pivotal movement between the position shown in solid outline and the position shown in dashed outline in FIG. 1.

Referring to FIG. 2, valving sub-assembly 46 includes a butterfly member 48 formed of molded elastomeric material and preferably thermoplastic elastomer having a hardness not greater than 50 on the shore "D" scale. One material that has been found satisfactory is available from Monsanto Corporation, and bears manufacturer's designation 103-40. However, it will be understood that other suitable thermoplastic elastomeric materials exhibiting the same properties may be used. Butterfly 48 has a hub portion indicated by reference numeral 50 which has torque-transmitting surfaces formed therein such as the opposed slots as denoted by reference numerals 52,53. Butterfly 48 also has formed integrally therewith stiffening ribs 54,56 extending in opposite directions outwardly from hub portion 50. The peripheral region of butterfly 48, remote from hub 50, and ribs 54,56 is substantially reduced in thickness from the hub and ribs, and provides resiliency to the periphery of the butterfly 48 for absorbing actuator shaft overtravel in the seated condition.

An actuator shaft 58, preferably formed of metal has torque-transmitters preferably oppositely disposed outwardly-extending tabs or wings 60,62 formed thereon. Shaft 58 is slidably received in hub 50 with the wings 60,62 engaging slots 52,53 for transmitting torque applied to shaft 58 to butterfly 48.

At assembly, the butterfly 48 is assembled into chamber 26 of housing section 12 and shaft 58 inserted through oppositely disposed aligned holes (not shown) in member 12 for engaging hub 50 of the butterfly 48 with the shaft journalled in the unshown holes.

In an alternative embodiment of valving subassembly 46, an optional metal reinforcing plate 64 is molded in the central portion of the butterfly 48 in the position shown in dashed outline in FIG. 2 for providing stiffening instead of stiffeners 54,56.

In operation, in an automotive heater core application, nipple 28 is connected to a source of engine coolant, such as a coolant pump (not shown), and nipple 36 is connected to the inlet of the heater core shown in phantom outline and denoted by reference numeral 70; and, nipple 34 is connected to the heater core outlet. Nipple 42 is connected to the return or coolant pump inlet (not shown). When the valving subassembly 46 is in the position shown in solid outline in FIG. 2 with the periphery of butterfly 48 sealed against the interior wall 66 of chamber 26, flow from inlet 32 goes through outlet 38 typically to the heater core 70 and is typically returned from the heater 70 through passage 34 into chamber 44 and flows through passage 42 typically to the return or pump inlet.

When the valving sub-assembly 46 is rotated to the position shown in dashed outline in FIG. 1, passages 38,34 are isolated from inlet 32 and flow therefrom is diverted directly to return passage 42. In a typical automotive heater application, the position of the valve subassembly 46 shown in dashed outline in FIG. 1 would represent the heater "OFF" condition.

The present invention thus provides a diverter valve, particularly suitable for controlling engine coolant flow in automotive heater applications, which employs a thermoplastic elastomer butterfly with a resiliently deformable periphery which is capable of absorbing actuator shaft overtravel in the closed or sealed position. The butterfly is formed with an integrally molded hub having torque-transmitting surfaces therein and oppositely directed stiffening ribs extending outwardly from the hub for stiffening the central region of the butterfly. Assembly is simplified by placing the butterfly in the valve body and axially sliding the winged actuator shaft through journals in the body into the hub such that the wings engaged the torque-transmitting surfaces in the butterfly hub.

Although the invention has been described with respect to the illustrated embodiments, it will be understood that the invention is capable of modification and variation, and is limited only by the following claims.

We claim:
1. A valve assembly comprising:
   (a) body means formed of rigid material defining a valving chamber with an inlet and outlet passage communicating with the chamber;
   (b) a butterfly member disposed in said chamber and movable between a position opening and a position blocking fluid communication between said inlet and outlet, said member having a hollow hub interiorly defining torque transmitting surfaces with a pair of generally rigid stiffeners extending outwardly therefrom in opposite directions and a relatively thin flexible marginal region thereabout, said hub, stiffeners, and marginal region formed integrally of thermoplastic elastomer; and,
   (c) shaft means received through said hub and engaging said torque transmitting surfaces, said shaft means mounted for rotational movement on said housing means and operable upon said rotational movement for moving said butterfly member between said open and blocking position, wherein overtravel movement of said shaft means in said blocking position is absorbed by resilient deformation of said marginal region.

2. The valve assembly defined in claim 1, wherein said body means is formed of polyamide material having a hardness of at least 115 on the Rockwell "R" scale.

3. The valve assembly defined in claim 1, wherein said hub and stiffeners have a metal insert molded therein.

4. The valve assembly defined in claim 1, wherein said body means is formed of polyamide material filled about forty percent (40%) by volume with fine glass particles.

5. The valve assembly defined in claim 1, wherein said butterfly member has a metal member insert molded in said hub and stiffeners.

6. The valve assembly defined in claim 1, wherein said butterfly member has a hardness not greater than 50 on the Shore "D" scale.

* * * * *